Patented Feb. 5, 1924.

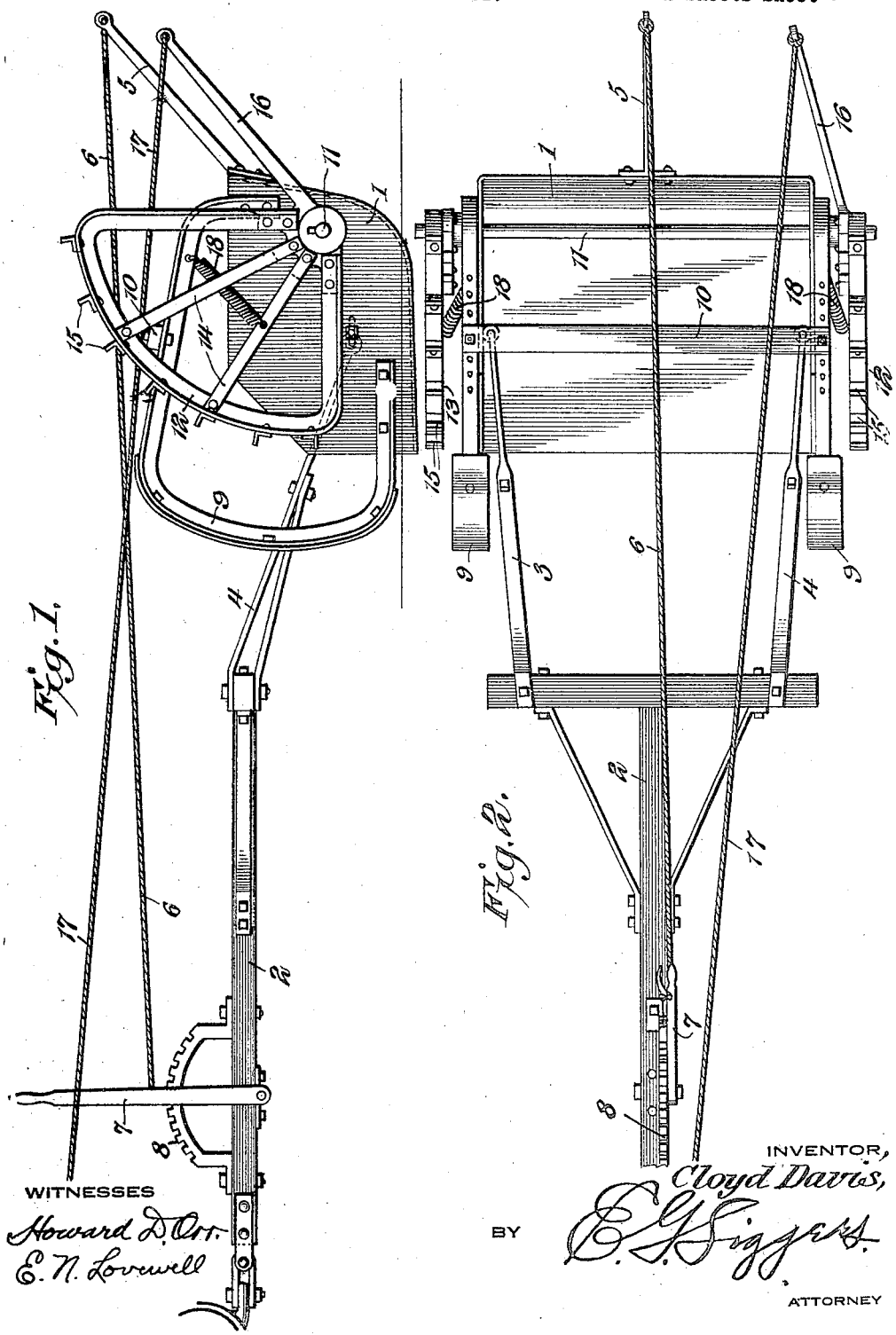

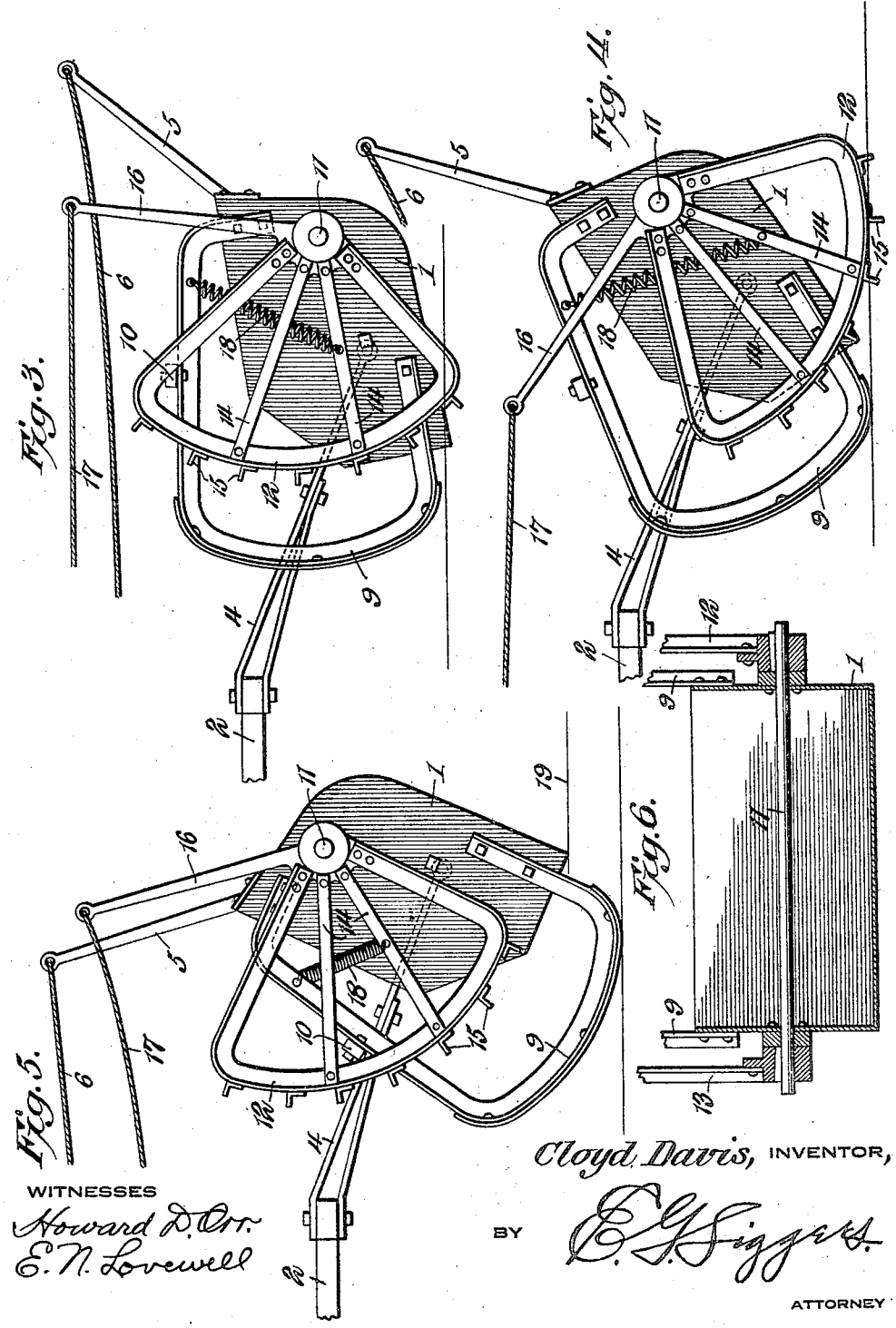

1,482,509

UNITED STATES PATENT OFFICE.

CLOYD DAVIS, OF MINEOLA, NEW YORK.

DUMPING DEVICE FOR SCRAPERS.

Application filed January 31, 1923. Serial No. 616,097.

*To all whom it may concern:*

Be it known that I, CLOYD DAVIS, a citizen of the United States, residing at Mineola, Long Island, in the county of Nassau and State of New York, have invented a new and useful Improvement in Dumping Devices for Scrapers, of which the following is a specification.

My invention relates to a dumping device which is adapted to be attached to any of the various types of scrapers now in general use, but is of especial value in connection with one which is drawn by a tractor and the entire operation is controlled by the driver.

In the scrapers hitherto constructed, which are provided with runners on which to ride while the load is being discharged or while returning for another load, it has been necessary in bringing the scoop to discharge position, to raise the rear part thereof entirely by manual effort until the runners engage the ground with sufficient friction to overbalance the scoop so that the continued forward pull of the tractor or horses rolls it onto the runners, in which position it advances until the scoop is emptied.

It is the object of the present invention, therefore, to provide a device which may be conveniently applied to any of the usual types of scraper so that the dumping operation will be made easier as well as more positive in its action.

More specifically, the invention includes means connected with the rear portion of the scoop and which may be easily rocked by the driver to engage the ground, and upon forward movement of the scraper act directly upon the rear portion of the scoop to tilt the same onto the runners and into discharge position. The device is easily rocked into engagement with the ground and the lifting is done by the tractor or draft animals, the lifting means being automatically returned to its normal position by springs as soon as the scoop has been tilted. The lever which has hitherto been used for lifting the scoop onto the runners is used in connection with my invention only for holding the cutting edge of the scoop in engagement with the ground while filling, or for depressing it below the depth for which the draft attachment has been adjusted.

The principles of my invention will be better understood from the following detailed description taken in connection with the accompanying drawings which illustrate the preferred form of the invention.

In the drawings:—

Fig. 1 is a side elevation of a tractor-drawn slide scraper with my invention applied thereto.

Fig. 2 is a plan view of the same.

Fig. 3 is a side elevation of the invention at the beginning of the dumping movement.

Fig. 4 is a similar view showing the position when the runners begin to engage the ground.

Fig. 5 is a similar view showing the scraper in full dumping position in which its load is spread uniformly over the ground.

Fig. 6 is a transverse sectional view through the scoop.

Referring more specifically to the drawings, the scraper comprises a scoop 1 to which a tongue 2 is connected by means of draw bars 3 and 4, in the usual manner, the connections betwen the draw bars and scoop being so located that the latter will be normally balanced so as to cut at the proper depth. Extending upwardly and rearwardly from the scoop is an arm 5 which is connected by a cable 6 with a lever 7 mounted on the tongue and adjustable in connection with the quadrant 8 to cause the cutting edge of the scoop to cut into the ground, and which, when the scoop is filled, may be adjusted rearwardly to slacken the cable 6 and permit the scoop to ride over the ground in transporting the load. Runners 9 are also secured to the scoop onto which the scoop rides into dumping position, and on which the empty scoop is carried when returning for another load. A cross bar 10 is adjustably mounted on the upper portions of the runners and engages the draw bars 3 and 4, as shown in Fig. 5, to limit the tilting movement and cause the load to be spread to any depth desired, depending upon the adjustment of the cross bar 10.

The parts hitherto described are of common construction and it has been customary to depend upon force applied to the arm 5 for lifting the rear portion of the scoop and rocking it forward until the runners 9 engage the ground sufficiently so that the forward pull on the draw bars 3 and 4 completes the dumping movement.

In carrying out my invention, a transverse rock shaft 11 is journaled in the rear portion of the scoop, and has secured to its ends a pair of eccentrics 12 and 13, which may be suitably formed from angle irons and braced with suitable spokes 14, traction lugs 15 being secured to the peripheries of the eccentrics so as to provide means for positive engagement with the ground. A lever arm 16 is secured to one end of the rock shaft 11 and is inclined upwardly and rearwardly when the scraper is in normal position with the scoop in position to engage the ground, and a cable 17 or other suitable means is connected with the upper end of the arm 16 and extends to a point within reach of the driver.

In the operation of the scraper, the same is drawn forwardly in the position shown in Fig. 1, the pivotal connections between the draw bars 3 and 4 and the scraper body being so adjusted that the scoop is properly balanced to be drawn forwardly and engage the ground at the proper depth. The lever 7 is adjusted forwardly in the usual manner until the scoop is filled and then is adjusted rearwardly to ease up on the cable 6 and permit the scoop to tilt backwardly to transport the load. When it is desired to dump the scoop, the cable 17 is drawn forwardly to rock the shaft 11 and eccentrics 12 and 13 until the lugs 15 engage the ground, as in Fig. 3. The resistance due to this engagement will then be sufficient so that the forward pull on the draft bars 3 and 4 will cause the rear portion of the scoop to be raised as the eccentrics roll along the ground until the runners 9 engage the ground, as seen in Fig. 4. Further forward movement will cause the scoop to roll forwardly on the runners 9 and resting thereon, to be raised from the ground until the adjustable cross bar 10 engages the draw bars 3 and 4. The raising of the scoop 1 will release the lugs 15 from the ground and the eccentrics will be returned to their normal position by the springs 18 which extend from one of the spokes 14 to the upper part of the runners 9. At this point in the operation, the parts will be in the position shown in Fig. 5 and the contents of the scoop will be spread over the ground at the level indicated at 19. The scraper then rides on the runners 9 back to the point of loading, when the tractor will be backed up sufficiently to roll the scoop back into its original position as shown in Fig. 1, ready for receiving another load.

From the foregoing description, it will be seen that the operation of my invention is very simple. The springs 18 may be only strong enough to overcome the weight of the eccentrics and rock shaft, and a very slight pull on the cable 17 will be sufficient to rock the eccentrics into engagement with the ground, whereupon all of the power necessary to tilt the scoop is furnished by the tractor, and the entire operation of dumping the scoop and returning the eccentrics to their normal position is accomplished automatically.

While I have shown and described specifically the construction and operation of one form in which my invention may be embodied, it will be understood that this is merely illustrative and that many modifications may be made in the structural details thereof, and that its principles may be used in connection with other types of scrapers, either of the wheeled or sliding type.

What is claimed is:—

1. The combination with a scraper, of an eccentric pivoted thereto and engageable with the ground to tilt the scraper body to dump its load.

2. The combination with a scraper, of an eccentric rockable thereon and engageable with the ground to tilt the scraper body to dump its load, and resilient means for normally holding the eccentric out of contact with the ground.

3. The combination with a scraper having a forwardly-projecting draw bar, eccentric means having a rocking connection with the rear portion of the scraper body, means operable from the forward end of the draw bar for causing the eccentric to engage the ground to tilt the scraper body and dump its load.

4. The combination with a scraper having a forwardly-projecting draw bar, eccentric means having a rocking connection with the rear portion of the scraper body, means operable from the forward end of the draw bar for causing the eccentric to engage the ground to tilt the scraper body and dump its load, and automatic means for returning the eccentric to normal position when the operating means is released.

5. The combination with a scraper, of a rock shaft journaled transversely thereof in rear of its center of gravity, eccentrics secured to the rock shaft and engageable with the ground to tilt the scraper body, an arm extending rearwardly and upwardly from the rock shaft, and means secured to the arm and operable from in front of the body to rock said shaft and eccentrics to dump the scraper.

6. The combination with a scraper, of a rock shaft journaled transversely thereof in rear of its center of gravity and having an eccentric secured to each end thereof, said eccentrics being engageable with the ground to tilt the scraper body, an arm extending rearwardly and upwardly from the rock shaft, a cable secured to the upper end of the arm and operable from in front of the scraper to rock said shaft and eccentrics to dump the scraper, and automatic means for immediately returning the rock shaft and eccentrics to their original positions as soon as the scraper is in dumping position.

7. In a scraper, the combination of a tiltable scoop, means connected with the scoop and operable by the forward movement of the scraper to dump the scoop, a spring normally retaining said means in inoperative position and automatically operable to return it to said position as soon as the scoop reaches dumping position.

8. In a scraper, the combination of a scoop having runners secured to its front side onto which it is tilted to discharge the load, manually actuated means for engaging the ground and raising the rear part of the scoop to cause the same to be tilted forwardly by the forward pull on the draft means, and spring means for returning said ground-engaging means to its original position as soon as the weight of the scoop is transferred to the runners.

9. In a scraper, the combination of a tiltable scoop having runners secured to its front side on which it rides when dumping, and means pivoted to the scoop and having an eccentric surface engageable with the ground and operated by the forward travel of the scraper to raise the scoop bodily from the ground and tilt it onto the runners.

10. In a scraper, the combination of a tiltable scoop having runners secured to its front side on which it rides when dumping, and means pivoted to the scoop and having an eccentric surface with projections engageable with the ground and operated by the forward travel of the scraper to raise the scoop bodily from the ground and tilt it onto the runners, means manually operable from a distance to throw said ground engaging means into operation, and spring means for returning said ground engaging means to its original position as soon as the weight of the scoop is transferred to the runners.

In testimony that I claim the foregoing as my own, I have hereto affixed my signature.

CLOYD DAVIS.